United States Patent
Takahashi

(10) Patent No.: US 8,717,608 B2
(45) Date of Patent: May 6, 2014

(54) TERMINAL DEVICE AND METHOD GENERATING PRINT DATA BASED ON ONE SET OF WEB-PAGE INFORMATION

(75) Inventor: Yusaku Takahashi, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 26 days.

(21) Appl. No.: 13/361,022

(22) Filed: Jan. 30, 2012

(65) Prior Publication Data

US 2012/0250081 A1 Oct. 4, 2012

(30) Foreign Application Priority Data

Mar. 31, 2011 (JP) ................................. 2011-080321

(51) Int. Cl.
*G06F 3/12* (2006.01)
(52) U.S. Cl.
USPC .......................................... 358/1.15; 358/1.1
(58) Field of Classification Search
USPC .................................................. 358/1.15, 1.1
See application file for complete search history.

(56) References Cited

U.S. PATENT DOCUMENTS

2010/0195131 A1* 8/2010 Nakata ........................ 358/1.13

FOREIGN PATENT DOCUMENTS

| JP | 2004-112766 | 4/2004 |
| JP | 2010-181971 | 8/2010 |

* cited by examiner

*Primary Examiner* — Benny Q Tieu
*Assistant Examiner* — Martin Mushambo
(74) *Attorney, Agent, or Firm* — Banner & Witcoff, Ltd.

(57) ABSTRACT

In a terminal device, a first requesting unit performs a first request requesting a web server for transmission of first web page data based on web-page information specifying data, the first web page data being specified by the web-page information specifying data and that corresponding to a first web-page-displaying software type. A second requesting unit performs a second request requesting transmission of web-page information based on the web-page information specifying data, the web-page information being either one of the first web page data and second web page data that is specified by the web-page information specifying data and that corresponds to a second web-page-displaying software type different from the first web-page-displaying software type. A print controlling unit generates print data based on one set of web-page information that is either the first web page data or the web-page information that is acquired as a result of the second request.

9 Claims, 8 Drawing Sheets

| IDENTIFYING NUMBER | USER AGENT TYPE | PAGE QUANTITY | USER AGENT IDENTIFIER |
|---|---|---|---|
| 1 | SMARTPHONE-SPECIFIC BROWSER | 5 | Mozilla/4.0 (Compatible; MSIE 6.0; Windows NT 5.1 T-01A_6.5; Windows Phone 6.5 |
| 2 | PC-SPECIFIC BROWSER | 8 | Mozilla/5.0 (compatible; MSIE 9.0; Windows NT 6.1; Trident/5.0) |
| 3 | MOBILE-PHONE-SPECIFIC BROWSER | 2 | SH901iC DoCoMo/2.0 SH901iC(c100;TB;W24H12) |

| PRIORITY RANKING | USER AGENT TYPE | USER AGENT IDENTIFIER |
|---|---|---|
| 1 | PC-SPECIFIC BROWSER | Mozilla/5.0 (compatible; MSIE 9.0; Windows NT 6.1; Trident/5.0) |
| 2 | MOBILE-PHONE-SPECIFIC BROWSER | SH901iC DoCoMo/2.0 SH901iC (c100;TB;W24H12) |
| 3 | SMARTPHONE-SPECIFIC BROWSER | Mozilla/4.0 (Compatible; MSIE 6.0; Windows NT 5.1 T-01A_6.5; Windows Phone 6.5 |

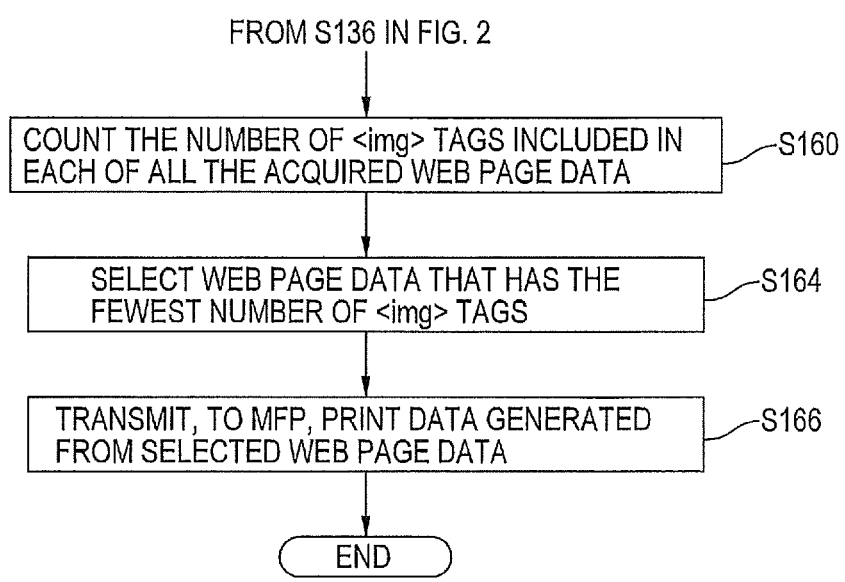

TERMINAL DEVICE AND METHOD GENERATING PRINT DATA BASED ON ONE SET OF WEB-PAGE INFORMATION

CROSS REFERENCE TO RELATED APPLICATION

This application claims priority from Japanese Patent Application No. 2011-080321 filed Mar. 31, 2011. The entire content of this priority application is incorporated herein by reference.

TECHNICAL FIELD

The present invention relates to a terminal device for obtaining suitable data for printing, and a method for controlling the terminal device to obtain suitable data for printing.

BACKGROUND

In recent years, there has been an increase in the types of terminal devices that can be used to browse Web pages, including personal computers (PCs), mobile phones, and smartphones (portable terminals that combine the functions of a mobile phone and a personal digital assistant (PDA)). These terminal devices use differing types or kinds of browsers (user agents) for browsing Web pages. Web servers for providing Web pages often provide a variety of different Web pages supported by different types of browsers. The Web pages can all be accessed using the same Uniform Resource Locator (URL). For example, a Web server may have different Web pages for a single URL prepared for use on a PC, smartphone, and mobile phone.

A conventional Web browser has an input controller that displays a print preview window when an instruction is received to display a print preview image of a Web page currently displayed in the browser. The Web browser can direct a printer to print the preview image when the user clicks on a print button.

SUMMARY

With the conventional technology described above, a user can print a Web page supported by the type of browser being used at the time, but cannot easily print Web pages supported by types of browsers other than the browser currently being used.

In view of the foregoing, the invention provides a terminal device, including: a web-page information specifying data reception unit; a first requesting unit; a first web page image displaying unit that is configured to display a first web page image based on the first web page data that is acquired as a result of the first request; a second requesting unit; and a print controlling unit. The web-page information specifying data reception unit is configured to receive web-page information specifying data specifying web-page information. The first requesting unit is configured to, if the web-page information specifying data reception unit receives web-page information specifying data, perform a first request requesting a web server for transmission of first web page data based on the web-page information specifying data, the first web page data being one set of web-page information that is specified by the web-page information specifying data and that corresponds to a first web-page-displaying software type. The first web page image displaying unit is configured to display a first web page image based on the first web page data that is acquired as a result of the first request. The second requesting unit is configured to perform a second request requesting the web server for transmission of web-page information based on the web-page information specifying data, the web-page information being either one of the first web page data and second web page data, the second web page data being a set of web-page information that is specified by the web-page information specifying data and that corresponds to a second web-page-displaying software type, the second web-page-displaying software type being different from the first web-page-displaying software type. The print controlling unit is configured to generate print data based on one set of web-page information that is either one of the first web page data that is acquired as a result of the first request and the web-page information that is acquired as a result of the second request.

According to another aspect, the present invention provides a method for controlling a terminal device, the terminal device including: a web-page information specifying data reception unit that is configured to receive web-page information specifying data specifying web-page information; a display portion that is configured to display an image; a requesting unit that is configured to request a web server for transmission of data; and a print data generating unit that is configured to generate print data, the method including: if the web-page information specifying data reception unit receives web-page information specifying data, controlling the requesting unit to perform a first request requesting a web server for transmission of first web page data based on the web-page information specifying data, the first web page data being one set of web-page information that is specified by the web-page information specifying data and that corresponds to a first web-page-displaying software type; controlling the display portion to display a first web page image based on the first web page data that is acquired as a result of the first request; controlling the requesting unit to perform a second request requesting the web server for transmission of web-page information based on the web-page information specifying data, the web-page information being either one of the first web page data and second web page data, the second web page data being a set of web-page information that is specified by the web-page information specifying data and that corresponds to a second web-page-displaying software type, the second web-page-displaying software type being different from the first web-page-displaying software type; and controlling the print data generating unit to generate print data based on one set of web-page information that is either one of the first web page data that is acquired as a result of the first request and the web-page information that is acquired as a result of the second request.

According to still another aspect, the present invention provides a computer readable storage medium storing a set of program instructions executed by a terminal device, the terminal device including: a web-page information specifying data reception unit that is configured to receive web-page information specifying data specifying web-page information; a display portion that is configured to display an image; a requesting unit that is configured to request a web server for transmission of data; and a print data generating unit that is configured to generate print data, the program instructions comprising: if the web-page information specifying data reception unit receives web-page information specifying data, controlling the requesting unit to perform a first request requesting a web server for transmission of first web page data based on the web-page information specifying data, the first web page data being one set of web-page information that is specified by the web-page information specifying data and that corresponds to a first web-page-displaying software type; controlling the display portion to display a first web page image based on the first web page data that is acquired as a result of the first request; controlling the requesting unit to perform a second request requesting the web server for transmission of web-page information based on the web-page information specifying data, the web-page information being either one of the first web page data and second web page data, the second web page data being a set of web-page information that is specified by the web-page information specifying data and that corresponds to a second web-page-displaying software type, the second web-page-displaying software type being different from the first web-page-displaying software type; and controlling the print data generating unit to generate print data based on one set of web-page information that is either one of the first web page data that is acquired as a result of the first request and the web-page information that is acquired as a result of the second request.

BRIEF DESCRIPTION OF THE DRAWINGS

The particular features and advantages of the invention as well as other objects will become apparent from the following description taken in connection with the accompanying drawings, in which:

FIG. 10 is a flowchart showing the operation of a browser application according to a fifth embodiment.

DETAILED DESCRIPTION

First Embodiment

Figure 1:
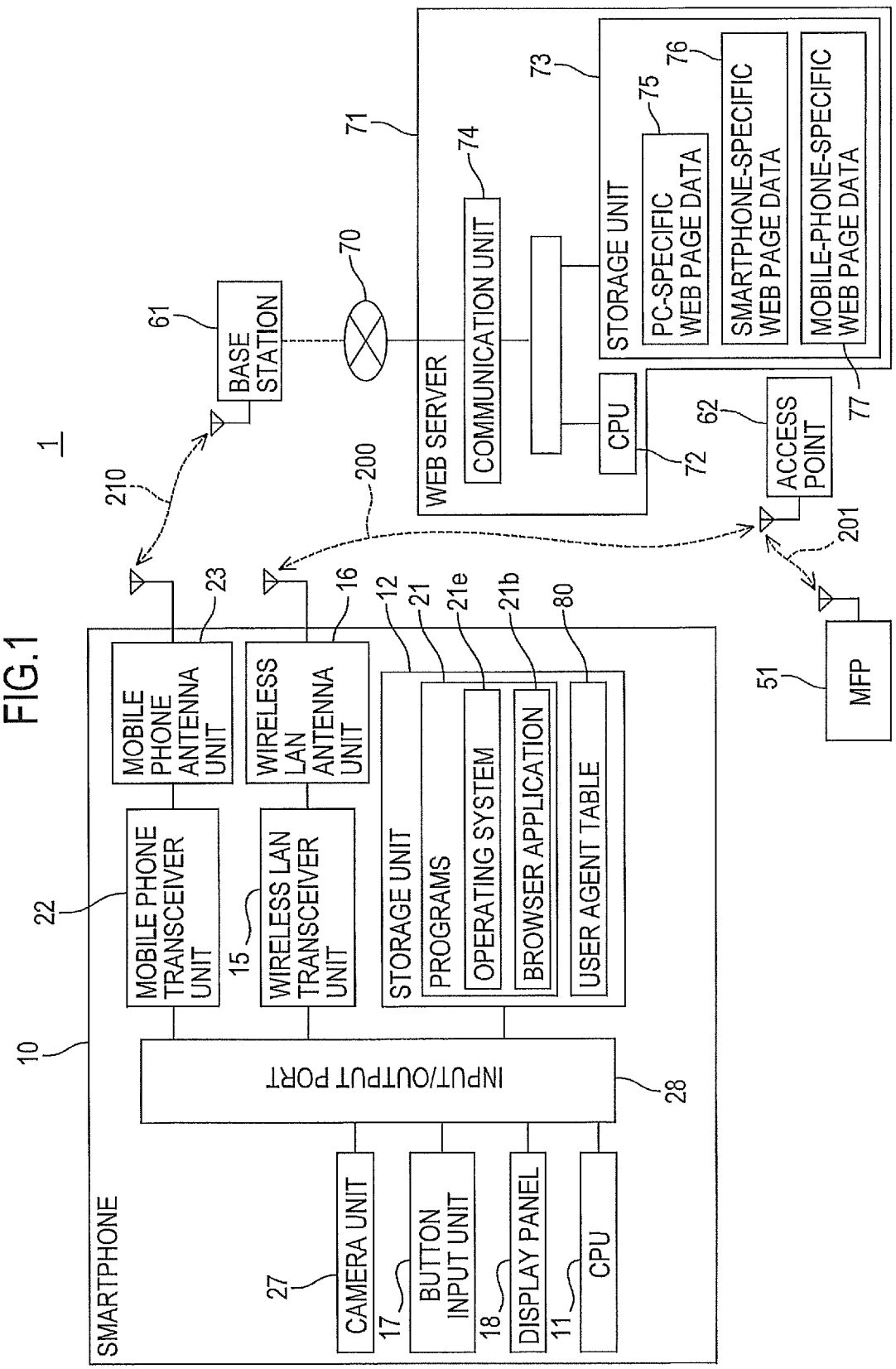
FIG. 1 is a block diagram of a communication system according to a first embodiment of the present invention.

FIG. 1 is a block diagram showing a communication system 1 according to a first embodiment of the present invention. The communication system 1 includes a smartphone 10, a multifunction peripheral (MFP) 51, an access point 62, a Web server 71, and a base station 61. The MFP 51 possesses various functions including a printer function, a scanner function, a copier function, and a facsimile function. The access point 62 is a data relay device well known in the art. The Web server 71 connects to the base station 61 via an internet 70.

The smartphone 10 and access point 62 are capable of performing wireless communications 200 on an infrastructure mode network employing wireless LAN connections. Similarly, the MFP 51 and access point 62 can perform wireless communications 201 on an infrastructure mode network employing wireless LAN connections. The wireless communications 200 and 201 are communications implemented according to one of the wireless network standards IEEE 802.11a, 802.11b, or 802.11g, for example. The smartphone 10 and Web server 71 are connected via the base station 61 and internet 70 and are capable of communicating with each other.

Here, the structure of the smartphone 10 will be described. The smartphone 10 is a multifunction mobile phone with a PDA function. The smartphone 10 primarily includes a CPU 11, a storage unit 12, a wireless LAN transceiver unit 15, a wireless LAN antenna unit 16, a button input unit 17, a display panel 18, a mobile phone transceiver unit 22, a mobile phone antenna unit 23, and a camera unit 27. The CPU 11, storage unit 12, wireless LAN transceiver unit 15, button input unit 17, display panel 18, mobile phone transceiver unit 22, and camera unit 27 are interconnected with one another via an input/output port 28.

The CPU 11 controls the functions of the smartphone 10 based on programs 21 stored in the storage unit 12. The programs 21 include a browser application 21b, and an operating system (OS) 21e. By executing a process based on the browser application 21b, the CPU 11 can acquire Web page data from the Web server 71, store Web page data in the storage unit 12, and display a Web page image on the display panel 18 represented by Web page data stored in the storage unit 12. The CPU 11 can also execute a process based on the browser application 21b that enables the user of the smartphone 10 to perform a printing operation and the like on the MFP 51. The OS 21e is a program that provides basic functions used by the browser application 21b.

The wireless LAN transceiver unit 15 performs infrastructure mode wireless communications 200 via the wireless LAN antenna unit 16, transmitting and receiving digital signals representing various data. Similarly, the mobile phone transceiver unit 22 conducts wireless communications 210 with the base station 61 via the mobile phone antenna unit 23. The button input unit 17 includes various keys for executing functions on the smartphone 10. The button input unit 17 may be integrally configured with the display panel 18 as a touch panel. The display panel 18 is a liquid crystal panel, for example, and displays information on the variation functions of the smartphone 10.

In addition to the programs 21, the storage unit 12 stores a user agent table 80. The storage unit 12 may be configured of a combination of random access memory (RAM), read-only memory (ROM), flash memory, and a hard disk. The CPU 11 implements processes based on the programs 21 stored in the storage unit 12. As mentioned above, the programs 21 include the browser application 21b and OS 21e. Hereafter, the CPU 11 that executes programs, such as the browser application 21b and OS 21e, may be referred to simply by the name of the program. For example, the "browser application 21b" appearing in the following description may signify the "CPU 11 executing the browser application 21b."

The browser application 21b is a user agent that instructs the CPU 11 to implement a process for displaying Web page images created from Web page data on the display panel 18. A user agent is a software application executed when a user uses data based on a certain protocol. The browser application 21b is a smartphone-specific browser application created specifically for the smartphone 10.

Figure 5:
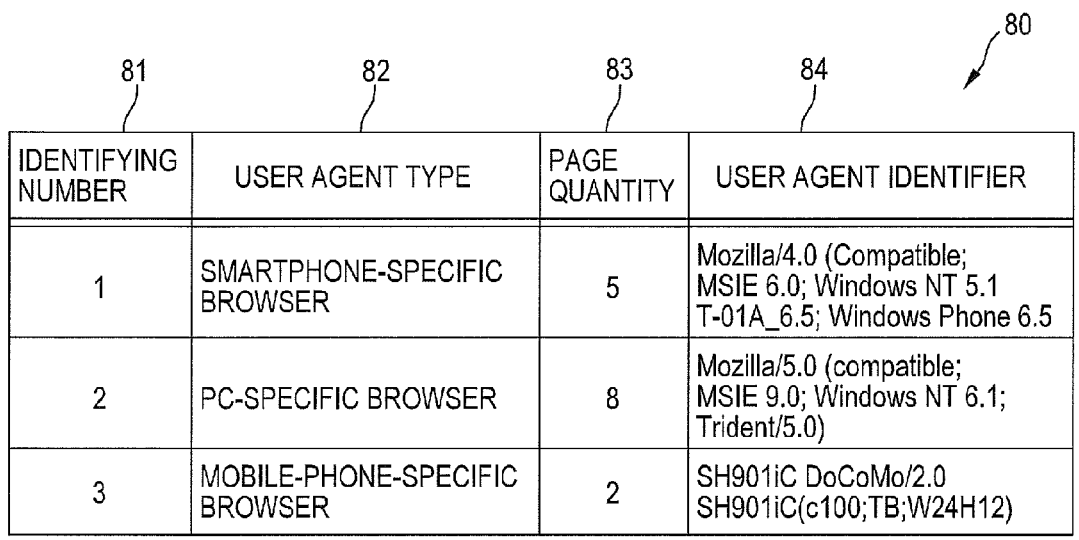
FIG. 5 shows a sample user agent table.

The user agent table 80 stores information on a variety of types or kinds of user agents for use in processes described later in S110 and S120 of the flowchart in FIG. 2. FIG. 5 shows a sample user agent table 80. The user agent table 80 shown in FIG. 5 stores identifying numbers 81, user agent types 82, page quantities 83, and user agent identifiers 84 in association with each other. The identifying numbers 81 are simply consecutive numbers used for identifying the user agents. The user agent types 82 are indicative of the types of the user agents, for which HTTP requests are to be issued, as will be described later in S110 and S120 of FIG. 2. In the example shown in FIG. 5, the user agent table 80 stores, as the user agent types 82, "smartphone-specific browser," "PC-specific browser," and "mobile-phone-specific browser" in association with the identifying numbers 81 "1", "2", and "3". The page quantities 83 indicate the number of sheets required to print all images produced from Web page data. The user agent identifiers 84 are text data including names of user agents that are of the user agent types 82. In this example, the user agent identifier 84 for "smartphone-specific browser" is "Mozilla/4.0 (Compatible; MSIE 6.0; Windows NT 5.1 T-01A__6.5; Windows Phone 6.5)" (where Windows is a registered trademark), the user agent identifier for "PC-specific browser" is "Mozilla/5.0 (Compatible; MSIE 9.0; Windows NT 6.1 Trident/5.0)," and the user agent identifier for "mobile-phone-specific browser" is "SH901iC DoCoMo/2.0 SH901iC(c100;TB;W24H12)". Data of the user agent types 82 and the user agent identifiers 84 is prestored in the user agent table 80. Data of the page quantities 83 is determined and stored in the user agent table 80 in S118 and S134 to be described later.

As shown in FIG. 1, the Web server 71 primarily includes a CPU 72, a storage unit 73, and a communication unit 74. The Web server 71 is a network device that stores Web data and provides such Web data and various functions to client devices, such as the smartphone 10. The CPU 72 controls the functions of the Web server 71. The storage unit 73 stores PC-specific Web page data 75, smartphone-specific Web page data 76, and mobile-phone-specific Web page data 77. The communication unit 74 transmits various data to the client devices.

The Web server 71 can be accessed by a variety of client devices, including PCs, smartphones, and mobile phones. Often these client devices use a browser application (user agent) specific to the device for browsing Web pages. For example, a PC may employ a PC-specific browser, a smartphone may employ a smartphone-specific browser, and a mobile phone may employ a mobile-phone-specific browser. Since different client devices have different design concepts related to the size and resolution of the display screen or its usability, the browser applications for different client devices will display Web pages differently. Accordingly, the Web server 71, which is a content provider, can support a variety of client devices by providing for a single URL various types of Web page data, including the PC-specific Web page data 75, the smartphone-specific Web page data 76, and the mobile-phone-specific Web page data 77.

Next, operations of the communication system 1 according to the first embodiment will be described with reference to FIGS. 2 through 5. An example of operations performed on the communication system 1 when the user initiates a printing operation in the browser application 21b of the smartphone 10 will be described with reference to FIG. 2. The CPU 11 of the smartphone 10 starts the browser application 21b when the user inputs an operation to launch the browser application 21b on the button input unit 17. In S108 at the beginning of the process in FIG. 2, the CPU 11 determines whether a URL was inputted by the user. The CPU 11 returns to S108 when input was not received (S108: NO) and continues to wait for input. When a URL has been inputted (S108: YES), the CPU 11 advances to S110.

Figure 3:
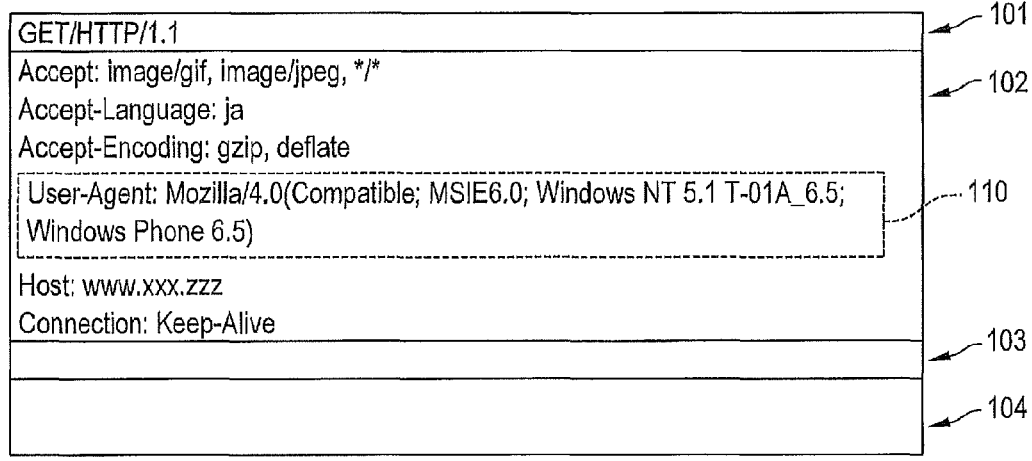
FIG. 3 shows sample message content of an HTTP request.

In S110 the CPU 11 sends an HTTP request to the specified URL requesting Web page data. FIG. 3 shows sample content of an HTTP request 100. The HTTP request 100 in FIG. 3 includes a request line 101, a header 102, an empty line 103, and a message body 104. The request line 101 indicates what information resource is requested to receive from the Web server 71 and includes the request method, the HTTP version, and the like. A method is a command to a Web server specifying a request. The HTTP version indicates the version of HTTP that the browser application 21b supports.

The header 102 is a component of the HTTP request that specifies information for the Web server 71 on the browser application 21b and may include information on the type of data supported by the browser application 21b, the method of data compression, and the type of browser application. The header 102 in FIG. 3 also includes a user agent string 110. The user agent string 110 constitutes one component of the HTTP request and includes the prefix "User-Agent:", which is the name of the header field, followed by a character string. Normally the user agent string 110 includes a user agent identifier and other information.

Since the user agent identifier in the user agent string 110 is self-reported by the smartphone 10, the smartphone 10 is free to use any name. In this example, in S110 the CPU 11 refers to the user agent table 80 (FIG. 5) and sets the user agent identifier in the user agent string 110 to the user agent identifier 84 representing the smartphone-specific browser. As shown in FIG. 3, therefore, the CPU 11 sets the user agent identifier in the user agent string 110 to "Mozilla/4.0 (Compatible; MSIE 6.0; Windows NT 5.1 T-01A__6.5; Windows Phone 6.5)". In this way, the smartphone 10 can convey to the Web server 71 that the smartphone 10 is using a browser application designed for a smartphone. Note that in the process of S120 described later the CPU 11 modifies the user agent identifier to an identifier representing a browser other than a smartphone-specific browser. Because the user agent string 110 is self-reported by a user agent, the CPU 11 can modify the user agent string 110 to such a user agent string that represents a browser other than the smartphone-specific browser.

The empty line 103 is used to communicate the end of the header 102 to the Web server 71. The message body 104 is used to transmit data to the Web server 71. An example of data transmitted via the message body 104 may be text data inputted in the entry field of a Web page. The message body 104 remains blank when there is no data to transmit to the Web server 71.

Upon receiving the HTTP request transmitted from the smartphone 10 in S110, the Web server 71 determines the type of browser application used by the client device based on the user agent identifier provided in the user agent string 110 of the HTTP request. Based on this determination, the Web server 71 selects Web page data suitable for the type of browser application from among the plurality of types of Web page data stored in the storage unit 73 and returns this Web page data to the smartphone 10 using an HTTP response. In this example, the Web server 71 determines that the browser application used by the smartphone 10 is a smartphone-specific browser. Accordingly, the Web server 71 selects the smartphone-specific Web page data 76 from the Web page data stored in the storage unit 73 and returns the smartphone-specific Web page data 76 to the smartphone 10.

Figure 4:
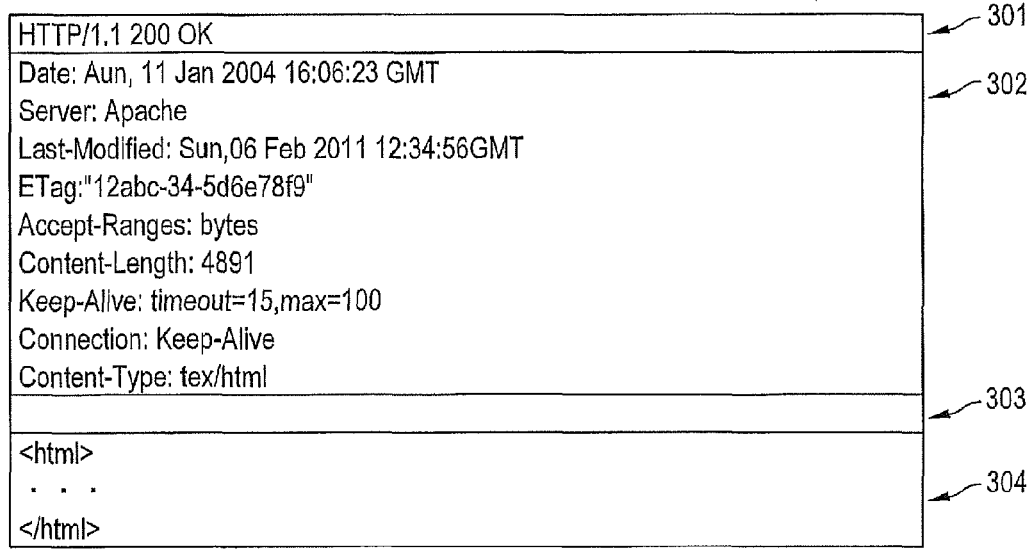
FIG. 4 shows sample message content of an HTTP response.

In S111 the CPU 11 receives the HTTP response from the Web server 71. FIG. 4 shows sample content for an HTTP response 300. The HTTP response 300 includes a response line 301, a header 302, an empty line 303, and a message body 304. The response line 301 holds information for conveying the processing results of the request on the Web server 71 to the browser application 21b and includes such information as the HTTP version, a status code, and a reason phrase. The header 302 includes header lines that provide information on the Web server 71 to the browser application 21b and may include such information as the type of the Web server 71, the type of content being returned, and the type of encoding used on the data (method of data compression). The empty line 303 serves to communicate to the browser application 21b the end of the header 302. The message body 304 holds the Web page data (an HTML document, image files, video files, etc.).

In S112 the CPU 11 analyzes the message body 304 contained in the HTTP response that was received from the Web server 71 in S111. By doing so, the CPU 11 can acquire the smartphone-specific Web page data 76, form a Web page image, and display the image on the display panel 18.

In S114 the CPU 11 determines whether the user has inputted a print command. That is, the CPU 11 determines whether an instruction to print a desired Web page image on the MFP 51 was received from the user through the button input unit 17 and the like. If such user input was not received (S114: NO), the CPU 11 continually returns to S114 to wait for this user input. When user input has been received (S114: YES), the CPU 11 advances to S116.

In S116 the CPU 11 acquires the size of paper currently set in the MFP 51. Specifically, the CPU 11 determines what size of paper (A4-size, for example) is available in the MFP 51 for printing, by communicating with the MFP 51 through the access point 62 using the wireless communications 200 and 201.

In S118 the CPU 11 generates, in the storage unit 12, print data for the image to be printed that is suitable for the paper size acquired in S116. The CPU 11 generates this print data by performing a rendering process well known in the art on the smartphone-specific Web page data 76 acquired in S112. For example, based on HTML data or XML data acquired from the Web server 71, the CPU 11 generates RAW data, JPG data, or PRN data, which can be subjected to a print process in the MFP 51. When generating print data based on the paper size, the CPU 11 counts the number of sheets that will be required to print all images represented by the smartphone-specific Web page data 76. Next, the CPU 11 stores the number of sheets counted above in the page quantity 83 field of the user agent table 80 (see FIG. 5) associated with the entry "smartphone-specific browser" stored in the user agent type 82 field. In the example of FIG. 5, the page quantity is "5". The method of calculating the number of pages is a common technique that has been conventionally performed with a printer driver and the like and will not be described here.

In S120 the CPU 11 selects a user agent type 82 from the user agent types 82 stored in the user agent table 80 with which an HTTP request has not been issued. Next, the CPU 11 changes the user agent identifier in the user agent string 110 of the HTTP request 100 to the user agent identifier 84 representing the selected user agent type 82. Next, the CPU 11 retransmits an HTTP request having the new user agent identifier to the Web server 71 based on the URL acquired in S108.

Based on the example of the user agent table 80 shown in FIG. 5, in S120 the CPU 11 sets the user agent identifier in the user agent string 110 to the user agent identifier 84 representing "PC-specific browser," which is the user agent type 82 associated with entry "2" as the identifying number 81. So, the CPU 11 sets the user agent identifier in the user agent string 110 to "Mozilla/5.0 (Compatible; MSIE 9.0; Windows NT 6.1 Trident/5.0)."

Upon receiving the HTTP request transmitted by the smartphone 10 in S120, the Web server 71 determines that the browser application used by the smartphone 10 is a PC-specific type based on the user agent identifier included in the user agent string 110 of the HTTP request. Therefore, the Web server 71 selects the PC-specific Web page data 75 from the Web page data stored in the storage unit 73 and returns this data to the smartphone 10.

In S122 the CPU 11 determines whether Web page data suited to the new user agent identifier was received from the Web server 71. More specifically, the CPU 11 determines whether Web page data is stored in the message body 304 of the HTTP response 300 returned from the Web server 71. The CPU 11 jumps to S136 when no Web page data was received (S122: NO) and advances to S130 when Web page data was received (S122: YES). In S130 the CPU 11 extracts the Web page data from the HTTP response 300. In the current example of the first embodiment, the CPU 11 extracts the PC-specific Web page data 75. In S132 the CPU 11 generates Web page images based on the extracted Web page data.

In S134 the CPU 11 generates, in the storage unit 12, print data suited to the paper size acquired in S116 and stores this data. The details of the process for generating print data are similar to the process of S118 described above and will not be repeated here. Further, when generating print data from the Web page data based on the paper size, the CPU 11 counts the number of sheets of paper that will be required to print all images represented by the PC-specific Web page data 75. The CPU 11 stores the number of sheets counted above in the user agent table 80 (see FIG. 5) as the page quantity 83 associated with the identifying number 81 selected in S120 ("2"; associated with the entry "PC-specific browser" for the user agent type 82). In this example, the CPU 11 stores "8" as the page quantity 83.

In S136 the CPU 11 determines whether HTTP requests were issued to the Web server 71 for all user agent types 82 recorded in the user agent table 80. If there remain any user agent types 82 for which an HTTP request was not issued (S136: NO), the CPU 11 returns to S120 and issues an HTTP request for a new user agent type 82 in the user agent table 80.

In the current example, an HTTP request has not yet been issued for the user agent type 82 corresponding to the identifying number 81 of "3" in the user agent table 80 (i.e., "the mobile-phone-specific browser"; S136: NO). Accordingly, the CPU 11 returns to S120 and repeats the process in S120-S134. During this process, the CPU 11 acquires in S130 the mobile-phone-specific Web page data 77 for the user agent type 82 of "mobile-phone-specific browser." In S134 the CPU 11 calculates the number of sheets of paper required to print all images represented by the mobile-phone-specific Web page data 77 (two sheets in this example) and stores this value in the page quantity 83 field corresponding to the entry in the user agent table 80 having the identifying number 81 of "3". Since the content of S120-S134 in the case of user agent type 82 of "mobile-phone-specific browser" is identical to the same process for user agent type 82 of "PC-specific browser" described earlier, this description will not be repeated.

When the CPU 11 determines in S136 that HTTP requests have been issued for all user agent types 82 stored in the user agent table 80 (S136: YES), in S138 the CPU 11 selects one user agent type 82 stored in the user agent table 80 that has the smallest page quantity 83. The CPU 11 then transmits print data corresponding to the selected user agent type 82 to the MFP 51 using the wireless communications 200 and 201. This completes the process in the flowchart of FIG. 2.

In the example of the user agent table 80 shown in FIG. 5, the smallest value recorded for the page quantity 83 is "2". Accordingly, in S138 the CPU 11 selects the user agent type 82 of "mobile-phone-specific browser" and transmits print data generated from the mobile-phone-specific Web page data 77 to the MFP 51.

As described above, the browser application 21b according to the first embodiment can acquire Web page data suited for a different type of browser application than the browser application 21b (such as a PC-specific browser application or a mobile-phone-specific browser application) and can generate print data from this Web page data. In this way, the browser application 21b can support a case such as when the amount of information included in Web page data suited to the browser application 21b in the smartphone 10 used by the user differs from that in the Web page data suited to another type of browser application. Therefore, the user can select Web page data having the smallest number of pages to be printed, for example. Accordingly, when the Web page for the browser application 21b of the smartphone 10 used by the user has a large amount of information, due to the inclusion of advertisements or other extraneous data, the browser application 21b can perform a printing process using print data generated based on Web page data with the least number of pages so that the printed Web page includes only the minimum essential information.

Further, in response to a print command inputted in S114, the browser application 21b of the embodiment acquires the PC-specific Web page data 75 or mobile-phone-specific Web page data 77 for a browser application of a different type than the browser application 21b used on the smartphone 10. Therefore, when the user of the browser application 21b is merely browsing image on Web pages, the browser application 21b does not acquire Web page data that is not necessary for browsing (the PC-specific Web page data 75, mobile-phone-specific Web page data 77, and the like).

Second Embodiment

Figure 6:
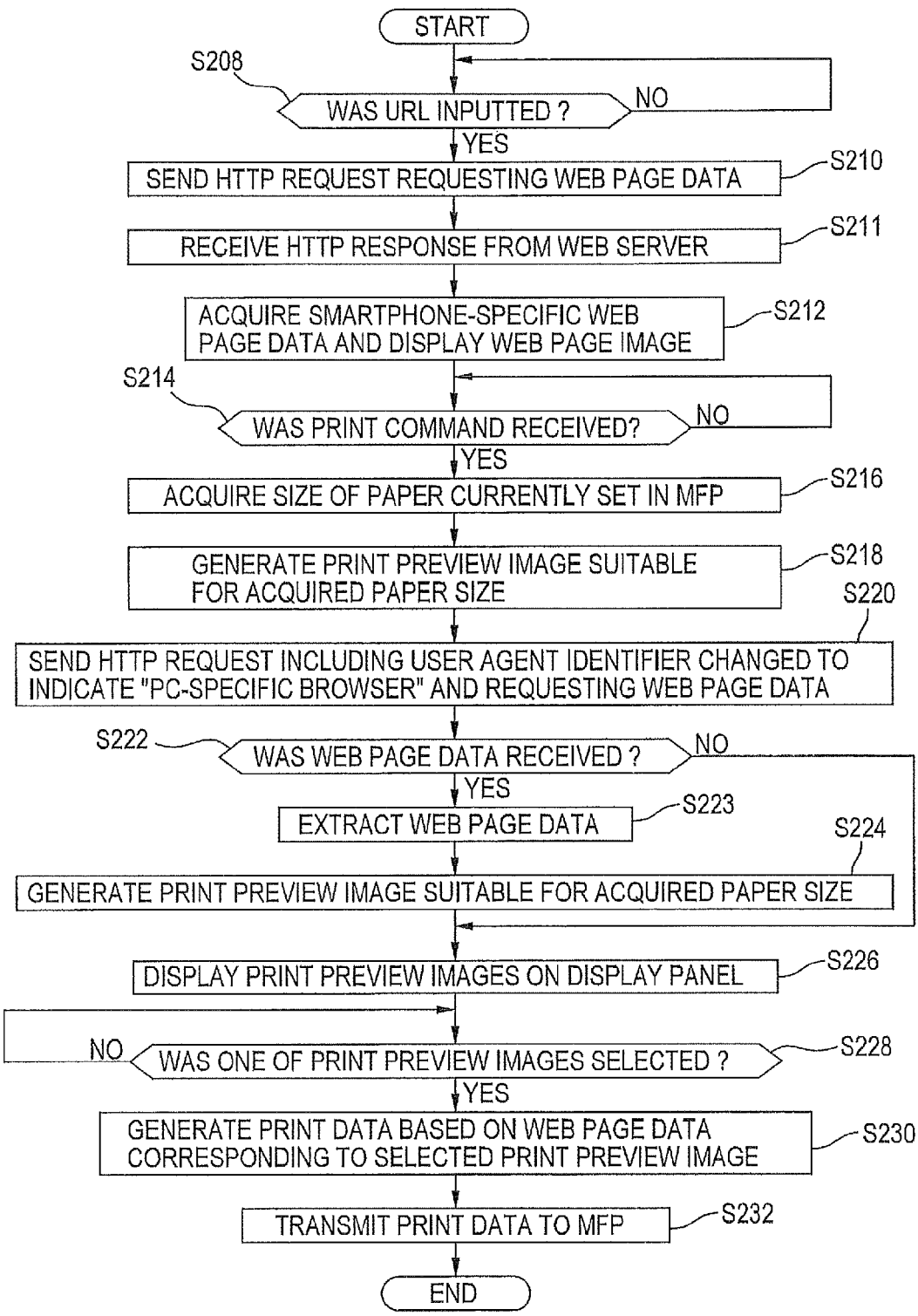
FIG. 6 is a flowchart showing the operation of a browser application according to a second embodiment.

Next, a print control method according to a second embodiment of the present invention will be described. The print control method according to the second embodiment employs a print preview. The communication system according to the second embodiment has a structure identical to the communication system 1 described in the first embodiment (see FIG. 1) and, hence, will not be described here. An example of operations performed on the communication system according to the second embodiment when the user initiates a printing operation in the browser application 21b of the smartphone 10 will be described with reference to FIG. 6. Processes in S208-S216 of FIG. 6 are identical to those in S108-S116 of FIG. 2 described in the first embodiment, except that the print command inputted in S214 serve as a command not only to print Web page data but also to display a print preview image before printing the Web page data.

In S218 the CPU 11 generates, in the storage unit 12, a print preview image that is suited to the paper size acquired in S216. The print preview image illustrates how a printed image produced from the smartphone-specific Web page data 76 acquired in S212 will appear when printed on paper. The print preview image is generated by performing a rendering process well known in the art.

In S220 the CPU 11 selects "PC-specific browser" from the user agent types 82 stored in the user agent table 80. Next, the CPU 11 changes the user agent identifier included in the user agent string 110 of the HTTP request 100 to the user agent identifier 84 representing "PC-specific browser." Subsequently, the CPU 11 retransmits an HTTP request including the modified identifier for the user agent to the Web server 71 located at the URL acquired in S208.

In S222 the CPU 11 determines whether the PC-specific Web page data 75 appropriate for a PC-specific browser was received from the Web server 71. The CPU 11 jumps to S226 if the PC-specific Web page data 75 was not received (S222: NO) and advances to S223 if the PC-specific Web page data 75 was received (S222: YES). In S223 the CPU 11 extracts the PC-specific Web page data 75 from the HTTP response 300.

In S224 the CPU 11 generates, in the storage unit 12, a print preview image suited to the acquired paper size based on the PC-specific Web page data 75 acquired in S223.

In S226 the CPU 11 displays the print preview image on the display panel 18. At this time, if the PC-specific Web page data 75 was not received in S222 (S222: NO), the CPU 11 displays only the print preview image generated in S218 based on the smartphone-specific Web page data 76 on the display panel 18. However, if the PC-specific Web page data 75 was received in S222 (S222: YES), in S226 the CPU 11 displays both the print preview image generated based on the smartphone-specific Web page data 76 and the print preview image generated in S224 based on the PC-specific Web page data 75.

In S228 the CPU 11 determines whether the user has selected one of the print preview images displayed on the display panel 18. The CPU 11 continually returns to S228 in a wait state while an image has not been selected (S228: NO) and advances to S230 when an image has been selected (S228: YES). In S230 the CPU 11 generates print data based on the Web page data corresponding to the user-selected print preview image. In S232 the CPU 11 transmits the print data generated in S230 to the MFP 51. Subsequently, the process in FIG. 6 ends.

According to this embodiment, as described above, in S226 the browser application 21b according to the second embodiment can display on the display panel 18 print preview images generated from Web page data for a plurality of user agent types 82. By selecting one of the print preview images displayed on the display panel 18, the user can choose the Web page data to be used for printing. Therefore, the browser application 21b improves convenience for the user.

Third Embodiment

Figures 8, 9:
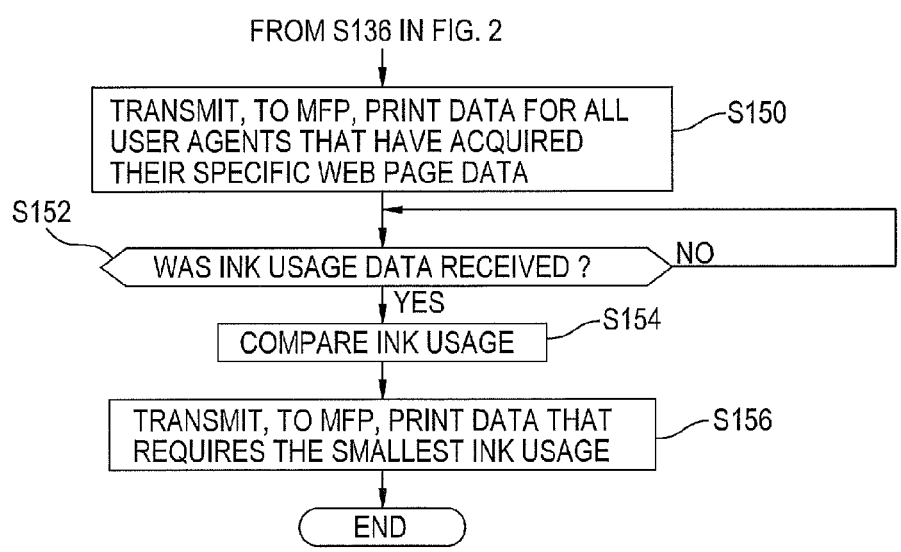
FIG. 8 shows a sample user agent table according to the third embodiment.
FIG. 9 is a flowchart showing the operation of a browser application according to a fourth embodiment.

Next, a print control method according to a third embodiment of the present invention will be described. In the third embodiment, the smartphone 10 employs a user agent table provided with a priority ranking. FIG. 8 shows a sample user agent table 80a used in the third embodiment. The user agent table 80a stores data of the user agent types 82 and the user agent identifiers 84, similarly to the user agent table 80 described in the first embodiment (see FIG. 5). However, the user agent table 80a stores priority rankings 81a, instead of the identifying numbers 81. The user agent table 80a does not store the page quantities 83. The priority rankings 81a are series of consecutive numbers for identifying the priorities of the user agent types 82. The priority rankings 81a may be preset by the user.

Figure 7:
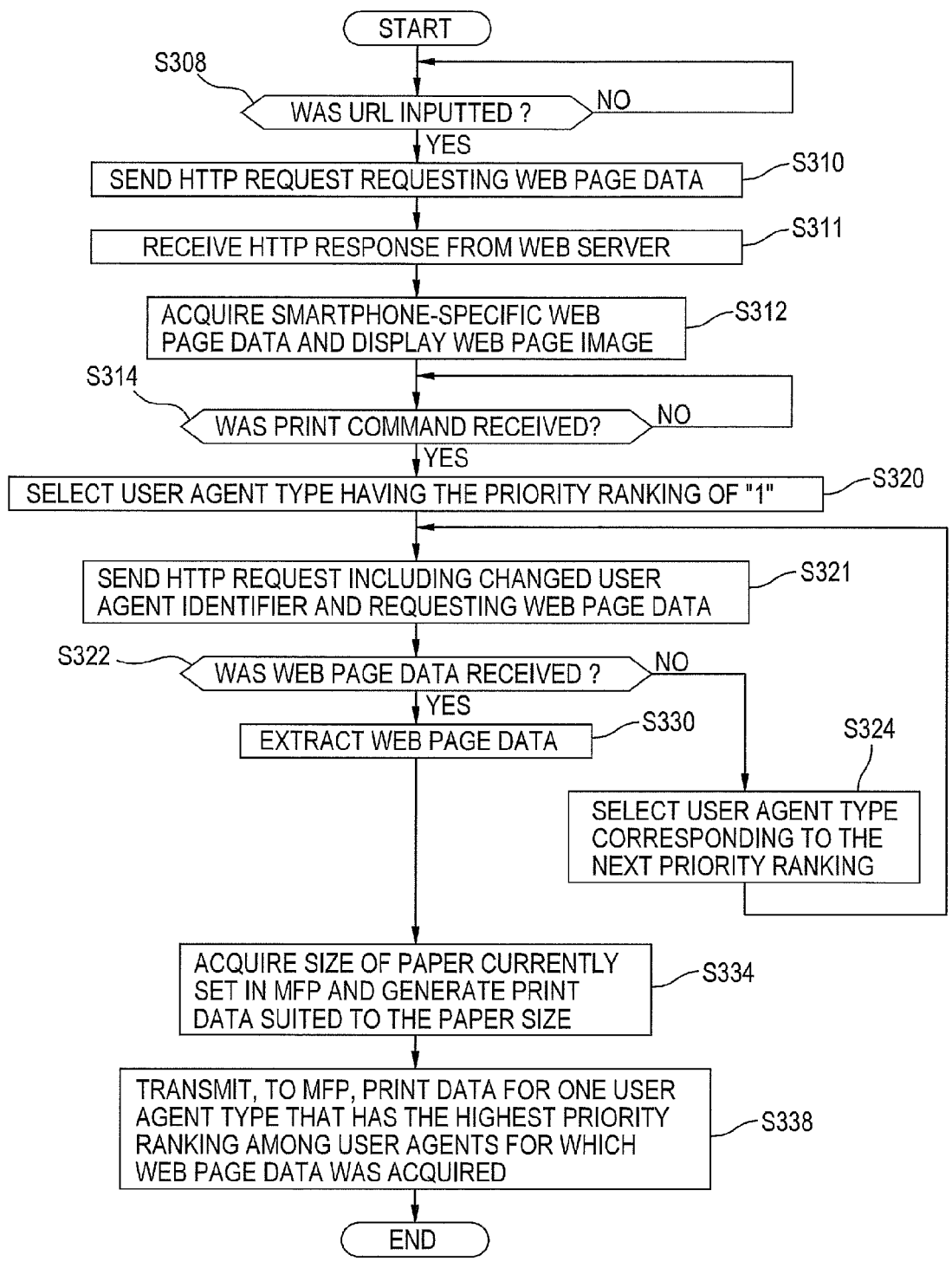
FIG. 7 is a flowchart showing the operation of a browser application according to a third embodiment.

Next, an example of operations performed on the communication system according to the third embodiment when the user initiates a printing operation on the browser application 21b of the smartphone 10 will be described with reference to FIG. 7. A description of the process in S308-S314 of FIG. 7 will be omitted since the process is identical to that in S108-S114 of FIG. 2 described in the first embodiment.

In S320 the CPU 11 selects the user agent type 82 having the priority ranking 81a of "1" from the user agent table 80a. In the example of FIG. 8, the CPU 11 selects "PC-specific browser" from the user agent table 80a.

In S321 the CPU 11 changes the identifier of the user agent in the user agent string 110 of the HTTP request 100 to the user agent identifier 84 representing "PC-specific browser." Next, the CPU 11 controls the mobile phone transceiver unit 22 to transmit an HTTP request including the modified user agent identifier 84 to the Web server 71 based on the URL acquired in S308. In S322 the CPU 11 determines whether the PC-specific Web page data 75 suitable for the modified user agent type 82 (the PC-specific browser) was received from the Web server 71. The CPU 11 advances to S324 when the PC-specific Web page data 75 was not received (S322: NO).

In S324 the CPU 11 selects the user agent type 82 corresponding to the next priority ranking 81a following the currently selected priority ranking 81a in order from the user agent table 80a. The CPU 11 changes the user agent identifier in the user agent string 110 of the HTTP request 100 to the identifier representing the newly selected user agent type 82 and returns to S321. In the example shown in FIG. 8, the CPU 11 selects "mobile-phone-specific browser" in the user agent table 80a having the priority ranking 81a of "2". Therefore, the CPU 11 changes the user agent identifier to the user agent identifier 84 representing "mobile-phone-specific browser."

On the other hand, if Web page data was received in S322 (S322: YES), in S330 the CPU 11 extracts the Web page data from the HTTP response 300. In S334 the CPU 11 acquires the paper size in a manner the same as that described in S116 of the first embodiment and generates print data suited to the paper size in the storage unit 12. In S338 the CPU 11 controls the wireless LAN transceiver unit 15 to transmit print data for one user agent type 82 that has the highest priority ranking 81a among the user agent types 82 for which Web page data was acquired to the MFP 51.

As described above, the browser application 21b according to the third embodiment can automatically print Web page data that has the highest priority ranking 81a from among available Web page data corresponding to a plurality of different user agent types 82. Therefore, the user can acquire printed results for optimal Web page data, without having to confirm whether Web page data exists for each of the user agent types 82. Accordingly, the browser application 21b of the third embodiment improves convenience for the user.

Fourth Embodiment

Next, a print control method according to the fourth embodiment of the present invention will be described. In the fourth embodiment, the smartphone 10 determines what print data to use for printing based on the required ink usage. The communication system according to the fourth embodiment has a structure identical to the communication system 1 described in the first embodiment (see FIG. 1) and, hence, will not be described here. An example of operations performed on the communication system according to the fourth embodiment when the user initiates a printing operation in the browser application 21b of the smartphone 10 will be described with reference to FIG. 9. A description of the process in FIG. 9 prior to S150 will be omitted since the process is identical to that in S108-S136 of FIG. 2 described in the first embodiment.

In S150 the CPU 11 controls the wireless LAN transceiver unit 15 to transmit all print data generated in S118 and S134 to the MFP 51. The MFP 51 calculates the quantity of ink usage for each print data received from the wireless LAN transceiver unit 15. The ink usage in this case represents the quantity of ink consumption required for printing. The MFP 51 returns data on the calculated ink usage to the smartphone 10. Since the method of calculating the quantity of ink consumption is a well-known technique performed by printer drivers and the like, a description of this method will not be provided here.

In S152 the CPU 11 determines whether ink usage data was received from the MFP 51. If such data was not received (S152: NO), the CPU 11 continually returns to S152 and waits until data has been received (S152: YES), then advances to S154. In S154 the CPU 11 compares the ink usage for all the sets of print data. In S156 the CPU 11 selects one set of print data that requires the smallest ink usage and controls the wireless LAN transceiver unit 15 to transmit the selected print data to the MFP 51. Subsequently, the process in FIG. 9 ends.

As described above, the browser application 21b according to the fourth embodiment can select and print Web page data that has the least amount of ink usage from among all the available Web page data corresponding to the plurality of user agent types 82. As a result, the browser application 21b can reduce ink usage in the MFP 51.

Fifth Embodiment

Next, a print control method according to a fifth embodiment of the present invention will be described. In the fifth embodiment, the smartphone 10 selects Web page data to be printed according to the quantity of Web page data. The communication system according to the fifth embodiment has a structure identical to the communication system 1 described in the first embodiment (see FIG. 1) and, hence, will not be described here.

An example of operations performed on the communication system according to the fifth embodiment when the user initiates a printing operation in the browser application 21b of the smartphone 10 will be described with reference to FIG. 10. A description of the process in FIG. 10 prior to S160 will be omitted since the process is identical to that in S108-S136 of FIG. 2 described in the first embodiment. In S160 the CPU 11 executes a process to count the number of <img> tags included in the HyperText Markup Language source of each of all Web page data that was acquired in S120 through S136 (the smartphone-specific Web page data 76, PC-specific Web page data 75, etc.). The <img> tags function to embed images in HTML pages. More specifically, an address of image data follows each <img> tag in the Web page data. When generating a Web page image based on the Web page data, the browser application 21b acquires image data by referring to the address following each <img> tag in the Web page data, and embeds an image of the acquired image data in the Web page image of the Web page data. So, the number of <img> tags included in the HyperText Markup Language source of each Web page data indicates the number of images to be included in a corresponding Web page image.

In S164 the CPU 11 selects one set of Web page data stored in the storage unit 12 having the fewest number of <img> tags. In S166 the CPU 11 controls the wireless LAN transceiver unit 15 to transmit print data generated from the selected Web page data to the MFP 51 using the wireless communications 200 and 201. Subsequently, the process in FIG. 10 ends.

Generally, images require a much larger volume of data than text and the like. Since the amount of image data in Web page data is less when the number of <img> tags is fewer, the browser application 21b can determine which Web page data has the smallest total quantity of data. Hence, the browser application 21b can select Web page data having the smallest data volume from among the plurality of types of Web page data corresponding to the plurality of user agent types 82. In this way, the browser application 21b can select and print Web pages that have the least amount of data.

Although the present invention has been described with respect to specific embodiments, it will be appreciated by one skilled in the art that a variety of changes may be made without departing from the scope of the invention. For example, certain features may be used independently of others and equivalents may be substituted all within the spirit and scope of the invention.

Variations of the Embodiments

In the above-described embodiments, the browser application 21b is stored in the storage unit 21. The browser application 21b may be originally stored in various types of computer-readable storage medium, such as a CD-ROM, USB memory, micro SD card, for example, and be loaded in the smartphone 10.

In the description of the embodiments, the CPU 11 of the smartphone 10 executes various processes based on the browser application 21b, but the present invention is not limited to this configuration. In variations of the embodiments described below, the CPU 11 may be configured to execute a process based on the browser application 21b for issuing an instruction to the OS 21e, other programs, and hardware components (such as the display panel 18) for implementing various processes.

The CPU 11 may execute a process to acquire Web page data from a Web server based on a process performed according to the OS 21e. In this case, the CPU 11 executing a process based on the browser application 21b in steps S130, S223, or S330, for example, would output a command to the OS 21e to perform a process to acquire Web page data.

The CPU 11 may also execute the process to generate print data based on Web page data according to a process performed based on the OS 21e. In this case, the CPU 11 executing steps S134, S230, or S334 based on the browser application 21b, for example, would output a command to the OS 21e to generate print data.

The CPU 11 may also execute the process for acquiring the size of the print media based on a process performed according to the OS 21e. In this case, the CPU 11 executes the process in S116 or S334 for example, based on the browser application 21b for outputting a command to the OS 21e to execute the process for acquiring the size of the print media.

The CPU 11 may also execute the process of transmitting print data to the MFP 51 based on a process performed according to the OS 21e. In this case, the CPU 11 executes the processes in S138, S232, S338, S156, or S166, for example, based on the browser application 21b outputting a command to the OS 21e to execute an operation to transmit print data.

In S120 of the first embodiment described above, the CPU 11 executing a process according to the browser application 21b controls the mobile phone transceiver unit 22 to retransmit an HTTP request including a modified user agent identifier to the Web server 71 based on the acquired URL. In other words, the CPU 11 executes this operation according to the browser application 21b, but the present invention is not limited to this configuration. For example, the CPU 11 may execute a process based on the OS 21e for controlling the mobile phone transceiver unit 22 to retransmit the HTTP request. In this case, the browser application 21b outputs an instruction to retransmit the HTTP request, and an application program interface (API) transmits the HTTP request in response to this command. Alternatively, an HTTP request transmission circuit may be provided for transmitting HTTP requests, for example. In this case, the smartphone 10 may be provided with a hardware component that includes the HTTP request transmission circuit. The browser application 21b then outputs an instruction to retransmit the HTTP request, and the HTTP request transmission circuit transmits the HTTP request in response to this command.

Further, in S138 of the first embodiment, the CPU 11 may select a user agent type 82 associated with print data having the largest page quantity 83. Similarly, in S164 of the fifth embodiment, the CPU 11 may select the user agent type 82 associated with Web page data having the largest number of <img> tags in the HTML source. Thus, if the amount of data included in the Web page for the browser application being used by the user is too small, the user can print a Web page with more information by performing a printing operation with Web page data having the largest page quantity or the largest number of <img> tags.

Figure 2:
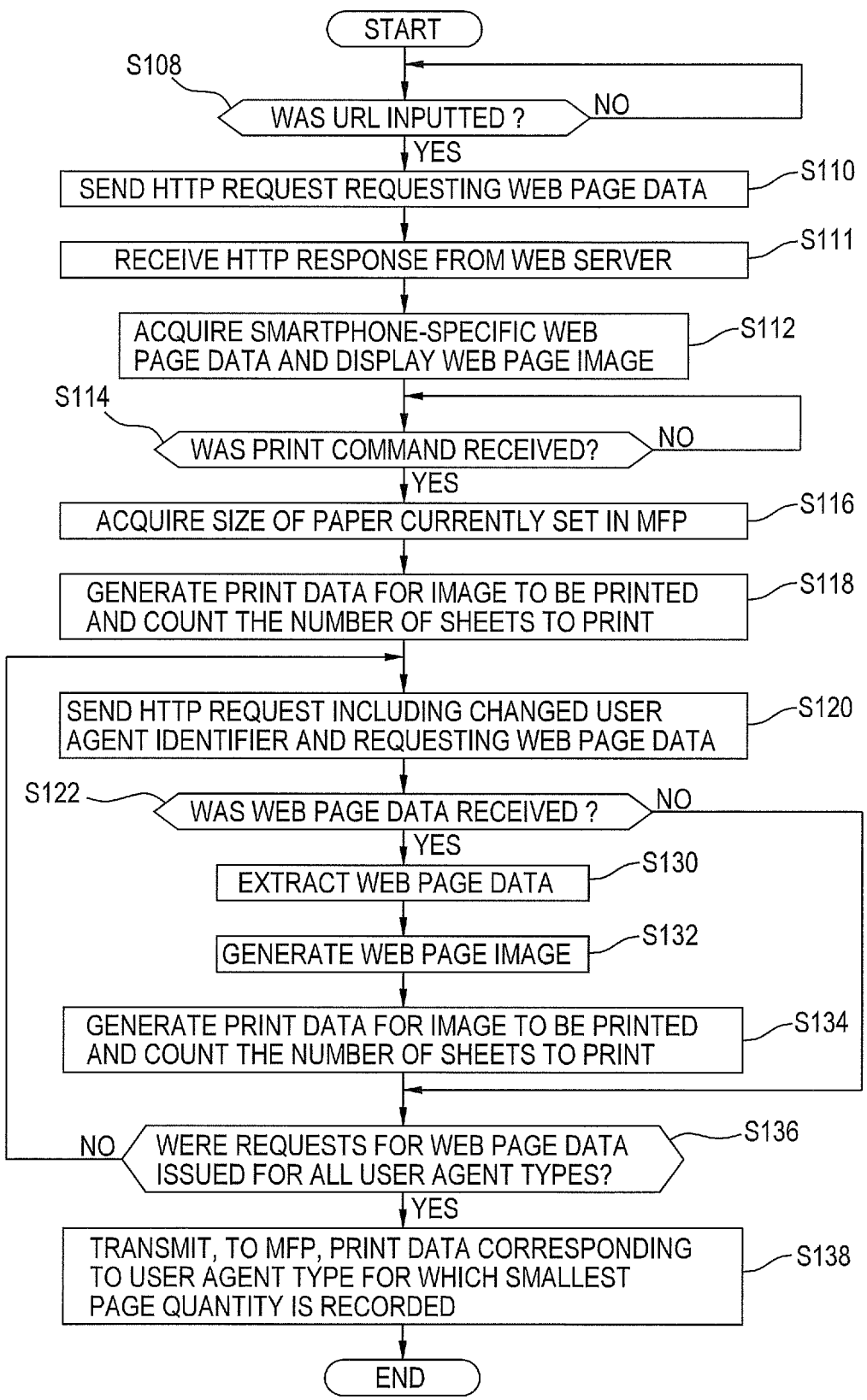
FIG. 2 is a flowchart showing the operation of a browser application according to the first embodiment.

In the first embodiment, the browser application 21b itself has functions for executing steps S108 through S138 in FIG. 2, but the present invention is not limited to this configuration. For example, a Web page acquisition application provided with functions for executing steps beginning from S114 may be incorporated in the browser application 21b as a plug-in. In this case, the browser application 21b executes processes beginning from the step for receiving an inputted URL (S108) to the step for displaying a Web page image (S112), and the Web page acquisition application executes processes after the step for displaying the Web page image. The Web page acquisition application may similarly be incorporated in the browser application 21b as a plug-in for the second through fifth embodiments. Alternatively, the Web page acquisition application may be called by the browser application 21b or OS 21e. In this case, the Web page acquisition application may acquire information that is obtained by the browser application 21b executing the processes in S108-S112 of FIG. 2.

In the embodiments, the Web server 71 is provided with the PC-specific Web page data 75, smartphone-specific Web page data 76, and mobile-phone-specific Web page data 77, but the Web server 71 may have more types of Web page data and is not limited to three types. For example, the Web page data may include a plurality of types of PC-specific Web page data corresponding to different types of browsers used on PCs.

Further, the PC-specific Web page data 75, smartphone-specific Web page data 76, and mobile-phone-specific Web page data 77 need not be stored in the storage unit 73 of the Web server 71, but may be stored on a different server. In this case, the Web server 71 may acquire the Web page data stored on the other server and return the data to the smartphone 10, or may perform a process to change the access destination of the smartphone 10 to that of the other server. Specifically, the Web server 71 may return an HTTP response to the smartphone 10 that includes information for changing the access destination to that of the other server. Based on the information included in the HTTP response received in S111 or the like, the CPU 11 can acquire an HTTP response similar to that shown in FIG. 4 by accessing the other server in S112 or the like using this information. Alternatively, the Web server 71 could transfer the HTTP request to the other server, enabling the other server to return an HTTP response like that in FIG. 4 to the original client.

While the CPU 11 acquires the size of paper available in the MFP 51 in S116 of the first embodiment, the present invention is not limited to this configuration. For example, the CPU 11 may acquire the paper size that has been preset in the browser application 21b or may use a paper size that has been prestored in the smartphone 10 as the size of paper available in the MFP 51.

The process for calculating quantities of ink usage in S150 of the fourth embodiment may be executed by any device, not just the MFP 51. For example, the CPU 11 of the smartphone 10 may be configured to calculate this ink usage.

The embodiments are all examples of the browser application 21b being used by the smartphone 10, but the browser application 21b may also be used by other terminal devices, such as a PC, mobile telephone, multifunction peripheral, and the like.

Each program used for implementing the print control method of the present invention may be configured of a single program module or a plurality of program modules. Further, each program may have a different replaceable structure. For example, each program may be realized by: a computer (CPU 11) executing processes based on an image-processing program (the browser application 21b, etc.); a computer executing processes based on programs other than the image-processing program (the browser application 21b, etc.), such as an operating system and other applications; a hardware component (the display panel 18, etc.) that operates in response to commands from the computer; or a combination of a computer and hardware components that work in association with one another. Each program may be realized also by: a computer that executes processes based on a plurality of programs in association with one another; or a hardware component that operates in response to commands from a computer executing processes based on a plurality of programs in association with one another.

What is claimed is:

1. A terminal device, comprising:
a processor; and
memory storing instructions that, when executed, cause the terminal device to function as:
    a web-page information specifying data reception unit that is configured to receive web-page information specifying data specifying web-page information;
    a first requesting unit that is configured to, if the web-page information specifying data reception unit receives web-page information specifying data, perform a first request requesting a web server for transmission of first web page data based on the web-page information specifying data, the first web page data being a set of web-page information that is specified by the web-page information specifying data and that corresponds to a first web-page-displaying software type;
    a first web page image displaying unit that is configured to display a first web page image based on the first web page data that is acquired as a result of the first request;
    an instruction reception unit that is configured to receive a user's instruction for displaying a print preview image and printing;
    a second requesting unit that is configured to perform a second request requesting the web server for transmission of second web page data based on the web-page information specifying data, the second web page data being another set of web-page information that is specified by the web-page information specifying data and that corresponds to a second web-page-displaying software type, the second web-page-displaying software type being different from the first web-page-displaying software type, the second requesting unit being configured to perform the second request if the instruction reception unit receives the user's instruction;
    a preview image display unit that is configured to display a first print preview image and a second print preview image based on the first web page data and the second web page data, respectively, the first print preview image being indicative of how print data to be generated based on the first web page data will be printed on a print medium, the second print preview image being indicative of how print data to be generated based on the second web page data will be printed on a print medium; and
    a print controlling unit that is configured to generate print data based on one set of web-page information that is either one of the first web page data that is acquired as a result of the first request and the second web page data that is acquired as a result of the second request.

2. The terminal device as claimed in claim 1, wherein the instructions, when executed, further cause the terminal device to function as:
    a print medium size acquiring unit that is configured to acquire a size of a print medium on which the generated print data is to be printed,
    wherein the preview image displaying unit is configured to display each of the first print preview image and the second print preview image based on the size of the print medium acquired by the print medium size acquiring unit.

3. The terminal device as claimed in claim 1, wherein causing the terminal device to function as the print controlling unit includes causing the terminal device to function as:
    a selection reception unit that is configured to receive a user's instruction to select one print preview image from among the first print preview image and second print preview images; and
    a selecting unit that is configured to select, from among the first web page data and the second web page data, one set of web page data that corresponds to the user's selected print preview image.

4. The terminal device as claimed in claim 1, wherein causing the terminal device to function as the second requesting unit includes causing the terminal device to function as:
    a software type selecting unit that is configured to select the second web-page-displaying software type from among a plurality of different web-page-displaying software types; and
    a second request executing unit that is configured to request the web server for transmission of the second web page data that is specified by the web-page information specifying data and that corresponds to the second web-page-displaying software type that is selected by the software type selecting unit.

5. A terminal device, comprising:
a processor; and
memory storing instructions that, when executed, cause the terminal device to function as:
    a web-page information specifying data reception unit that is configured to receive web-page information specifying data specifying web-page information;
    a first requesting unit that is configured to, if the web-page information specifying data reception unit receives web-page information specifying data, perform a first request requesting a web server for transmission of first web page data based on the web-page information specifying data, the first web page data being a set of web-page information that is specified by the web-page information specifying data and that corresponds to a first web-page-displaying software type;
    a first web page image displaying unit that is configured to display a first web page image based on the first web page data that is acquired as a result of the first request;

a second requesting unit that is configured to perform a second request requesting the web server for transmission of second web page data based on the web-page information specifying data, the second web page data being another set of web-page information that is specified by the web-page information specifying data and that corresponds to a second web-page-displaying software type, the second web-page-displaying software type being different from the first web-page-displaying software type; and a print controlling unit that is configured to generate print data based on one set of web-page information that is either one of the first web page data that is acquired as a result of the first request and the second web page data that is acquired as a result of the second request, wherein the print controlling unit includes a selecting unit that is configured to select one set of web page data from among a plurality of sets of web page data, which are made up from the first web page data and the second web page data, the print controlling unit being configured to generate the print data based on the one set of web page data selected by the selecting unit, wherein the selecting unit is configured to select one set of web page data from among the plurality of sets of web page data such that one of the following conditions is satisfied:

(A) a number of print media determined for the selected one set of web page data is either largest or smallest among a plurality of numbers of print media determined for the plurality of sets of web page data, the number of print media being determined for each set of web page data as a number of print media required to print an entire web page image indicated by print data to be generated based on the each set of web page data, (B) an amount of data included in the selected one set of web page data is either largest or smallest among amounts of data included in the plurality of sets of web page data, or (C) a number of sets of reference data determined for the selected one set of web page data is largest or smallest among the numbers of sets of reference data determined for the plurality of sets of web page data, the number of sets of reference data being determined for each set of web page data as a number of sets of reference data that is included in the each set of web page data, each set of reference data indicating a set of image data.

6. The terminal device as claimed in claim 5, wherein the instructions, when executed, further cause the terminal device to function as:

an additional requesting unit that is configured to perform at least one additional request requesting the web server for transmission of additional web page data based on the web-page information specifying data, the additional web page data being at least one set of web-page information that is specified by the web-page information specifying data and that corresponds to at least one additional web-page-displaying software type which is different from the first and second web-page-displaying software types; and wherein the plurality of sets of web page data further includes the additional web page data, the selecting unit being configured to select one set of web page data from among the plurality of sets of web page data including the first, second, and additional web page data such that one of the conditions (A), (B), and (C) is satisfied.

7. The terminal device as claimed in claim 5, wherein the second requesting unit includes:

a software type selecting unit that is configured to select the second web-page-displaying software type from among a plurality of different web-page-displaying software types; and a second request executing unit that is configured to request the web server for transmission of the second web page data that is specified by the web-page information specifying data and that corresponds to the second web-page-displaying software type that is selected by the software type selecting unit.

8. A non-transitory computer readable storage medium storing instructions executable by a terminal device, the instructions, when executed, causing the terminal device to:

receive web-page information specifying data specifying web-page information;

if the web-page information specifying data is received, perform a first request requesting a web server for transmission of first web page data based on the web-page information specifying data, the first web page data being a set of web-page information that is specified by the web-page information specifying data and that corresponds to a first web-page-displaying software type;

display a first web page image based on the first web page data that is acquired as a result of the first request;

receive a user's instruction for displaying a print preview image and printing;

if the user's instruction is received, perform a second request requesting the web server for transmission of second web page data based on the web-page information specifying data, the second web page data being another set of web-page information that is specified by the web-page information specifying data and that corresponds to a second web-page-displaying software type, the second web-page-displaying software type being different from the first web-page-displaying software type;

display a first print preview image and a second print preview image based on the first web page data and the second web page data, respectively, the first print preview image being indicative of how print data to be generated based on the first web page data will be printed on a print medium, the second print preview image being indicative of how print data to be generated based on the second web page data will be printed on a print medium; and generate print data based on one set of web-page information that is either one of the first web page data that is acquired as a result of the first request and the second web page data that is acquired as a result of the second request.

9. A non-transitory computer readable storage medium storing instructions executable by a terminal device, the instructions, when executed, causing the terminal device to:

receive web-page information specifying data specifying web-page information;

if the web-page information specifying data is received, perform a first request requesting a web server for transmission of first web page data based on the web-page information specifying data, the first web page data being a set of web-page information that is specified by the web-page information specifying data and that corresponds to a first web-page-displaying software type;

display a first web page image based on the first web page data that is acquired as a result of the first request;

perform a second request requesting the web server for transmission of second web page data based on the web-page information specifying data, the second web page data being another set of web-page information that is specified by the web-page information specifying data and that corresponds to a second web-page-displaying software type, the second web-page-displaying software type being different from the first web-page-displaying software type;

select one set of web page data from among a plurality of sets of web page data, which includes the first web page data and the second web page data, such that one of the following conditions is satisfied:

(A) a number of print media determined for the selected one set of web page data is either largest or smallest among a plurality of numbers of print media determined for the plurality of sets of web page data, the number of print media being determined for each set of web page data as a number of print media required to print an entire web page image indicated by print data to be generated based on the each set of web page data, (B) an amount of data included in the selected one set of web page data is either largest or smallest among amounts of data included in the plurality of sets of web page data, or (C) a number of sets of reference data determined for the selected one set of web page data is largest or smallest among the numbers of sets of reference data determined for the plurality of sets of web page data, the number of sets of reference data being determined for each set of web page data as a number of sets of reference data that is included in the each set of web page data, each set of reference data indicating a set of image data; and generate print data based on the selected one set of web page data.

* * * * *